United States Patent
Ogishi et al.

(10) Patent No.: US 9,424,702 B2
(45) Date of Patent: Aug. 23, 2016

(54) PARKING LOCKERS

(71) Applicant: PAYPAL, INC., San Jose, CA (US)

(72) Inventors: Tracy Ogishi, Redwood City, CA (US); Darren Michail Endo, Walnut Creek, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 14/292,550

(22) Filed: May 30, 2014

(65) Prior Publication Data

US 2015/0348345 A1    Dec. 3, 2015

(51) Int. Cl.
*G07C 9/00* (2006.01)

(52) U.S. Cl.
CPC ....... *G07C 9/00912* (2013.01); *G07C 9/00166* (2013.01)

(58) Field of Classification Search
CPC .......... G06Q 20/208; G06Q 20/3274; G06Q 30/0601; G06Q 10/0832; G07G 1/0054; G07C 9/00142; G07C 9/00166; G07C 9/00571; G07C 11/00; G07C 2009/00825; G07C 9/00912; G07C 9/00817; G07C 9/00309; G07C 2009/0092; G07F 17/12; A47G 2029/144; A47G 29/141; A47G 2029/145; A47G 2029/147
See application file for complete search history.

(56) References Cited

U.S. PATENT DOCUMENTS

| | | | |
|---|---|---|---|
| 2003/0171996 A1* | 9/2003 | Chen | G06Q 10/08 705/26.81 |
| 2003/0220835 A1* | 11/2003 | Barnes, Jr. | G06Q 10/1053 705/14.36 |
| 2003/0222760 A1* | 12/2003 | Hara | G07F 5/26 340/5.73 |
| 2007/0024421 A1* | 2/2007 | Hale | G07C 9/00309 340/5.73 |
| 2009/0179735 A1* | 7/2009 | Van Rysselberghe | A47G 29/141 340/5.73 |
| 2009/0201198 A1* | 8/2009 | Moudy | G06Q 10/087 342/357.75 |
| 2013/0088323 A1* | 4/2013 | Ryan | G06Q 10/08 340/5.7 |
| 2014/0214572 A1* | 7/2014 | Cancro | G06Q 20/208 705/21 |

* cited by examiner

*Primary Examiner* — An T Nguyen
(74) *Attorney, Agent, or Firm* — Haynes and Boone, LLP

(57) ABSTRACT

Methods and systems for retrieving or depositing a package using a beacon are described. A locker and parking space are assigned to a user or selected by the user, and the user is able to access the locker using a mobile device. The mobile device transmits identification information to a beacon associated with the locker. This information is passed to a service provider, who identifies the user or the locker and causes the locker to open.

17 Claims, 4 Drawing Sheets

PARKING LOCKERS

BACKGROUND

1. Field of the Invention

The present invention generally relates to a method of retrieving or depositing packages and reducing the burden of carrying packages during a shopping trip.

2. Related Art

Typically, a shopping center has a plurality of retail sales locations or stores, and some of these shopping centers have hundreds of stores which are located side-by-side over considerable distances on pedestrian thoroughfares or walkways. Shoppers are able to move over these thoroughfares and into the retail establishments to make purchases and receive packages of their goods at these points of purchase. Because one may wish to shop at stores that happen to be far apart, it is a nuisance, and often quite difficult for some individuals to carry their packages while they continue to shop. Furthermore, if the burden of carrying packages is great enough, one may be forced to cut short the intended shopping trip. Accordingly, there is a need to lessen this burden on shoppers.

Figure 1:
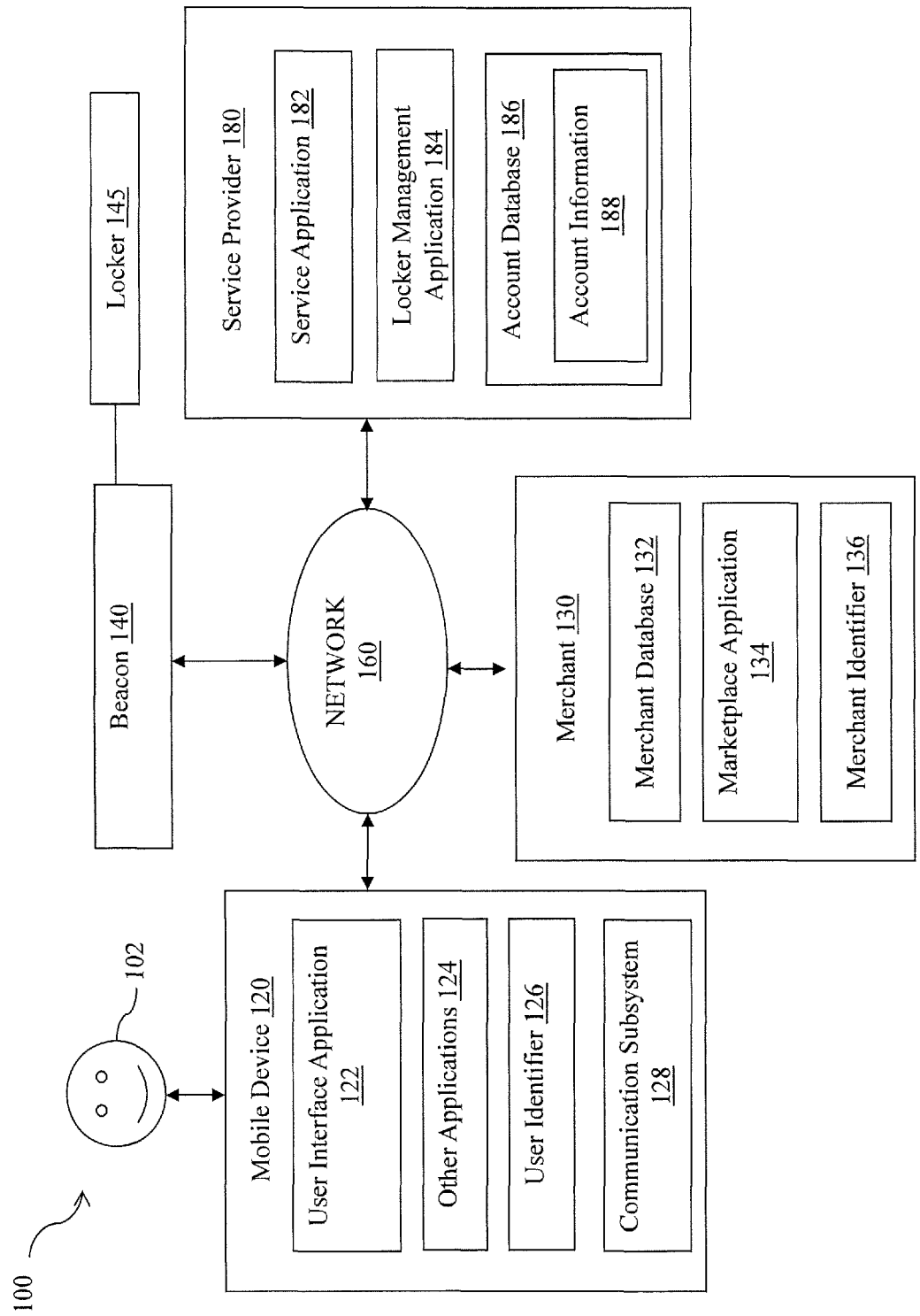
FIG. 1 is a block diagram illustrating a system for retrieving or depositing a package according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods that remove user friction associated with retrieving and depositing packages. In various embodiments, a user is able to automatically access a locker associated with a parking space without manually providing identification or authentication information. For example, the user need not provide a password or personal identification number (PIN).

In one embodiment, the user goes shopping, pulls into a parking space, and selects a locker close to the parking space. The user uses his or her mobile device to connect with a beacon associated with the selected locker. As the user purchases items, authorized merchants can open the selected locker to place the purchased items in the locker. When the user wants to open the locker, the beacon recognizes the mobile device of the user, and the locker is unlocked or opened.

In another embodiment, a locker is assigned to a user, a merchant places purchased products or items in the locker, and the locker is automatically opened when the user's mobile device is detected. The mobile device transmits identification information (e.g., user ID, password, PIN, account information, telephone number, address, email address, etc.) to a beacon associated with the locker. Once the beacon receives this information, it is passed along to a service provider, who identifies the user and the locker assigned to the user. The service provider causes the locker assigned to the user to be opened so that the user can retrieve the package. The same method can be used to drop off a package in the locker.

FIG. 1 shows one embodiment of a block diagram of a network-based system 100 adapted to provide access to a package using a mobile device 120 over a network 160. As shown, system 100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

As shown in FIG. 1, the system 100 includes a mobile device 120 (e.g., a smartphone or a wearable computing device with a RFID chip), a merchant server or device 130, a beacon 140 (e.g., a radio frequency beacon or Bluetooth Low Energy (BLE) beacon), a storage compartment or locker 145 associated with the beacon 140, and at least one service provider server or device 180 (e.g., network server device) in communication over the network 160. The network 160, in one embodiment, may each be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The mobile device 120 is configured to perform one or more tasks when mobile device 120 is located in proximity to the beacon 140. The task to be performed can include, for example, launching an application program, setting certain files to non-accessible mode, initiating a phone call, sounding an alarm, storing a message, displaying a message, receiving a message, sending a message, etc.

The mobile device 120, in various embodiments, may be implemented using any appropriate combination of hardware and/or software configured for wired and/or wireless communication over the network 160. The mobile device 120, in one embodiment, may be utilized by the user 102 to interact with the service provider server 180 over the network 160. For example, the user 102 may conduct financial transactions (e.g., account transfers, bill payment, etc.) with the service provider server 180 via the mobile device 120. In various implementations, the mobile device 120 may include a wireless telephone (e.g., cellular or mobile phone), a tablet, a wearable computing device, a personal computer, a notebook computer, and/or various other generally known types of wired and/or wireless computing devices.

The mobile device 120, in one embodiment, includes a user interface application 122, which may be utilized by the user 102 to conduct financial transactions (e.g., shopping, purchasing, bidding, etc.) or information transactions with the merchant server or device 130 or the service provider server 180 over the network 160. In one aspect, purchase expenses may be directly and/or automatically debited from an account related to the user 102 by the service provider when the user 102 uses the user interface application 122.

In one implementation, the user interface application 122 comprises a software program, such as a graphical user interface (GUI), executable by a processor that is configured to interface and communicate with the service provider server 180 via the network 160. In another implementation, the user interface application 122 comprises a browser module that provides a network interface to browse information available over the network 160. For example, the user interface application 122 may be implemented, in part, as a web browser to view information available over the network 160.

In an example, the user 102 is able to access merchant websites via the one or more merchant servers 130 to view and select items for purchase, and the user 102 is able to purchase items from the one or more merchant servers 130 via the service provider server 180. Accordingly, in one or more embodiments, the user 102 may conduct transactions (e.g., purchase and provide payment for one or more items) from the one or more merchant servers 130 via the service provider server 180.

The mobile device 120, in various embodiments, may include other applications 124 as may be desired in one or more embodiments of the present disclosure to provide additional features available to user 102. In one example, such other applications 124 may include security applications for implementing client-side security features, calendar application, contacts application, location-based services application, programmatic client applications for interfacing with appropriate application programming interfaces (APIs) over the network 160, and/or various other types of generally known programs and/or software applications. In still other examples, the other applications 124 may interface with the user interface application 122 for improved efficiency and convenience.

The mobile device 120, in one embodiment, may include at least one user identifier 126, which may be implemented, for example, as operating system registry entries, cookies associated with the user interface application 122, identifiers associated with hardware of the mobile device 120, or various other appropriate identifiers. The user identifier 126 may include one or more attributes related to the user 102, such as personal information related to the user 102 (e.g., one or more user names, passwords, PIN numbers, photograph images, biometric IDs, addresses, phone numbers, etc.) and banking information and/or funding sources (e.g., one or more banking institutions, credit card issuers, user account numbers, security data and information, etc.). In various implementations, the user identifier 126 may be passed with a user login request to the service provider server 180 via the network 160, and the user identifier 126 may be used by the service provider server 180 to associate the user 102 with a particular user account maintained by the service provider server 180.

In some embodiments, the mobile device 120 includes a communication subsystem 128, which can include radio frequency receivers and transmitters and/or optical (e.g., infrared) receivers and transmitters. The specific design and implementation of the communication subsystem 128 can depend on the communication network over which the mobile device 120 is intended to operate. For example, the mobile device 120 can include communication subsystems designed to operate over a Global System for Mobile Communication (GSM) network, a General Packet Radio Service (GPRS) network, an Enhanced Data Rates for Global Evolution (EDGE) network, a Wi-Fi or WiMax network, an LTE Direct network, and a Bluetooth™ network.

The one or more merchant servers 130, in various embodiments, may be maintained by one or more business entities (or in some cases, by a partner of a business entity that processes transactions on behalf of business entities). Examples of businesses entities include merchant sites, resource information sites, utility sites, real estate management sites, social networking sites, etc., which offer various items for purchase and payment. In some embodiments, business entities may need registration of the user identity information as part of offering items to the user 102 over the network 160. As such, each of the one or more merchant servers 130 may include a merchant database 132 for identification items for sale, which may be made available to the mobile device 120 for viewing and purchase by the user 102. In one or more embodiments, user 102 may complete a transaction such as purchasing the items via the service provider server 180.

Each of the merchant servers 130, in one embodiment, may include a marketplace application 134, which may be configured to provide information over the network 160 to the user interface application 122 of the mobile device 120. For example, user 102 may interact with the marketplace application 134 through the user interface application 122 over the network 160 to search and view various items available for purchase in the merchant database 132.

Each of the merchant servers 130, in one embodiment, may include at least one merchant identifier 136, which may be included as part of the one or more items made available for purchase so that, e.g., particular items are associated with particular merchants. In one implementation, the merchant identifier 136 may include one or more attributes and/or parameters related to the merchant, such as business and banking information. In various embodiments, user 102 may conduct transactions (e.g., searching, selection, monitoring, purchasing, and/or providing payment for items) with each merchant server 130. The service provider server 180 can assist in providing payment for items over the network 160.

A merchant website may also communicate (for example, using merchant server 130) with the service provider through service provider server 180 over network 160. For example, the merchant website may communicate with the service provider in the course of various services offered by the service provider to merchant website, such as payment intermediary between customers of the merchant website and the merchant website itself. For example, the merchant website may use an application programming interface (API) that allows it to offer sale of goods in which customers are allowed to make payment through the service provider, while user 102 may have an account with the service provider that allows user 102 to use the service provider for making payments to merchants that allow use of authentication, authorization, and payment services of service provider as a payment intermediary. The merchant website may also have an account with the service provider.

Beacon 140 may be a hardware device including sensors that is separate from a user device and transportable, or it can be a user device that includes Bluetooth technology. To prevent theft of beacons in cases where the beacon 140 is transportable, the beacon 140 may be "locked down" such that it would not function if moved to another location without secure configuration changes. Beacon 140 may be set up by merchants or individuals offering various items, such as products and/or services for sale. As defined herein, a "beacon" is a short range communication device having a known or fixed location that provides a signal that can be detected by mobile devices within a certain proximity of the beacon. An example of a beacon is a radio frequency (RF) beacon (e.g., Bluetooth™ low energy (BLE) beacon), infrared beacon or a radio frequency identifier (RFID) tag. For example, a BLE beacon can broadcast an RF signal that includes its position coordinates (e.g., latitude, longitude), which can be detected by a mobile device. In some implementations, the beacon can also advertise location based services provided by a beacon network. A beacon network encompasses a plurality of beacons in a geographic region.

Beacon 140 is typically maintained by one or more service providers. When user 102 comes in range of beacon 140, a mobile application on the mobile device 120 run by a service provider can wake up and connect to the beacon 140. Mobile device 120 can then receive messages from beacon 140, and beacon 140 can receive messages from the mobile device 120. In some implementations, beacon 140 is a BLE beacon. Beacon 140 can transmit customized messages to the mobile device 120 based on the location of the mobile device 120.

Beacon 140 can output a wireless signal that can be detected by mobile device 120 when mobile device 120 is within a certain proximity of the beacon 140. Beacon 140 may be a device that periodically or continuously transmits a signal, such as a short-distance wireless (e.g., BLE), medium distance wireless (e.g., Wi-Fi), and/or other electro, magnetic, and/or electro-magnetic transmissions. Power on beacon 140 can be adjusted to communicate only within a desired range, which may depend on intended message ranges. Mobile device 120 is configured to detect the transmitted signals from beacon 140, such that when mobile device 120 is located within the transmission range of beacon 140, the signal may be detected.

The locker 145 is a compartment or enclosure capable of holding items. The locker 145 may be part of a group of lockers. Each locker 145 in the group may include a display device, input device (e.g., keypad), key reader, a printer, and a beacon (e.g., beacon 140). The display device may be any known display device such as a conventional monochrome CRT display device, LCD screen, touch sensitive display screen, plasma screen, or the like. The input device may be a numerical keypad, conventional computer keyboard, touch sensors in a display device, or any other device that may be used to convey information. The key reader may be an electronic, magnetic, or optical card reader, bar code scanner, or any other device that may be used to read an entry key. The printer may be a receipt printer as is known in the art, or any other device that can generate physical copies of information for later review and/or use. Each locker 145 in the group of lockers may operate in a variety of ways (i.e., not all the lockers have to operate in the same way). For example, the locker 145 may operate using numeric codes, passwords, bar codes, or a smart card. In certain embodiments, a merchant accesses a locker by using the key reader and/or input device. In various embodiments, the beacon 140 is used to lock and unlock the locker 145, as further described below.

The service provider server 180, in one embodiment, may be maintained by a transaction processing entity, which may provide processing for financial transactions and/or information transactions between the user 102, merchant server 130, and beacon 140. As such, the service provider server 180 includes a service application 182, which may be adapted to interact with the mobile device 120, merchant server 130, and/or beacon 140 over the network 160. In one example, the service provider server 180 may be provided by PayPal®, Inc., eBay® of San Jose, Calif., USA, and/or one or more financial institutions or a respective intermediary that may provide multiple point of sale devices at various locations to facilitate transaction routings between merchants and, for example, financial institutions.

The service provider server 180, in one embodiment, may be configured to maintain one or more user accounts and merchant accounts in an account database 186 each of which may include account information 188 associated with one or more individual users (e.g., user 102) and merchants. For example, account information 188 may include private financial information of user 102, such as one or more account numbers, passwords, credit card information, banking information, or other types of financial information, which may be used to facilitate financial transactions between user 102 and a merchant. In various aspects, the methods and systems described herein may be modified to accommodate users and/or merchants that may or may not be associated with at least one existing user account and/or merchant account, respectively.

In one implementation, the user 102 may have identity attributes stored with the service provider server 180, and user 102 may have credentials to authenticate or verify identity with the service provider server 180. User attributes may include personal information, banking information and/or funding sources. In various aspects, the user attributes may be passed to the service provider server 180 as part of a login, search, selection, purchase, and/or payment request, and the user attributes may be utilized by the service provider server 180 to associate user 102 with one or more particular user accounts maintained by the service provider server 180.

In various embodiments, the service provider server 180 includes locker management application 184. Locker management application 184 manages a drive-up locker service that is available to user 102. In exemplary embodiments, a locker (e.g., locker 145) or group of lockers are placed in proximity to a parking space, and the locker 145 or group of lockers are associated with beacon 140. When the user 102 drives up and parks in the parking space, he or she is able to access locker 145, and pick up a package stored in the locker 145 or drop off a package in the locker 145. In some embodiments, the beacon 140 receives identification information from mobile device 120. The locker management application 184 receives the identification information from the beacon 140, identifies the user 102 based on the identification information, matches the user 102 with a locker, and causes the locker to be opened so that the user 102 can retrieve or drop off a package.

Figure 2:
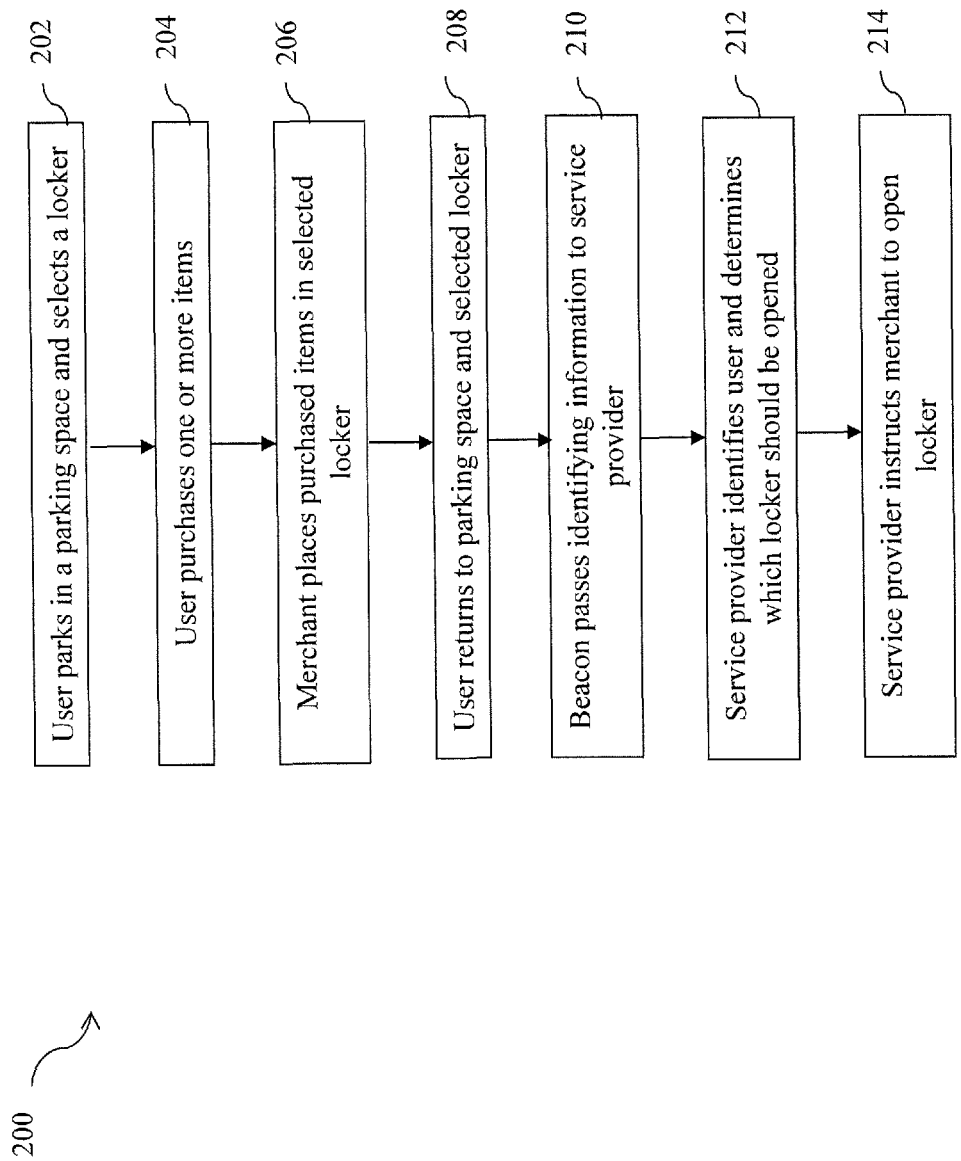
FIG. 2 is a flowchart showing a method for retrieving or depositing a package according to an embodiment of the present disclosure.

Referring now to FIG. 2, a flowchart 200 of a method for retrieving or depositing a package is illustrated according to an embodiment of the present disclosure. In various embodiments, the user 102 registers with a service provider, which runs a mobile application. Registration may include signing up for the service and agreeing to any terms required by the service provider, such as through a user device. In one embodiment, the user device is a mobile computing device, such as a smartphone, a PC, or a computing tablet. In other embodiments, registration may be done completely through the user device, partially through the user device, or without using the user device, such as through a phone call or in-person visit to a representative of the payment service provider.

The user may be requested to provider specific information for registration, such as, but not limited to, a name, address, phone number, email address, picture, a user name for the account, a password or PIN for the account, or other biometric identification such as a fingerprint. The type of information may depend on whether the user already has an account with the service provider. Requested information may be entered through the user device or other means, including voice or manual key entry. Once all the requested information is received and confirmed, the service provider may create an account for the user.

At step 202, the user 102 parks in a parking space in a merchant parking lot and selects a locker close to the parking space. For example, the locker may be a locker right next to the space, or a locker at the end of the parking row. In one embodiment, the mobile device 120 is a smartphone. The smartphone connects to the beacon 140 associated with the selected locker 145. The beacon 140 links the user 102 to the selected locker 145 so that the user 102 can open the locker 145 when the beacon 140 recognizes the smartphone. In another embodiment, the mobile device 120 is a wearable device with an RFID chip (e.g., RFID bracelet) that is issued to the user 102 and that is already linked to locker 145. When the user 102 wants to open locker 145, the beacon 140 recognizes the wearable device as associated with the locker 145, and the locker 145 opens.

The locker is typically not associated with just one merchant, but instead can be used by many merchants. In certain embodiments, the locker is part of a group of lockers managed or maintained by a shopping mall where the merchant is located. Individual lockers may be a variety of sizes so as to fit various items or packages. Alternatively, the lockers may be sized uniformly.

In exemplary embodiments, the locker is located in a parking lot or parking structure and is associated with a specific parking space. A beacon (e.g., beacon 140) may be associated with a specific locker (e.g., locker 145) or group of lockers. The beacon 140 can receive identification information from the mobile device 120 when the user 102 comes within a certain range of the beacon 140, and passes on the identification information so that the correct locker is opened. In various embodiments, each parking space includes its own locker and its own beacon. Only the user 102 is able to access the locker while the user 102 is parked in the parking space, and no one else can open the locker until the parking space is empty. In some embodiments, the beacon 140 detects the mobile device 120 as the user 102 pulls into the parking space, and associates the mobile device 120 with the locker even if the locker is not being used. In this way, a locker opens any time the mobile device 120 is detected. The beacon 140 detects the mobile device 120 a second time as the user 102 pulls out of the parking space, thereby removing the user 102's access to the locker. In other embodiments, a group of parking spaces (e.g., a portion of a parking lot) may be associated with a group of lockers and a beacon. The beacon is located in proximity to the locker and/or parking space. By locating the locker next to or in proximity to a parking space, it is easier for the user 102 to load/unload and place packages in a car or other vehicle. In some embodiments, the user 102 does not need to get out of the car to receive the package, but may obtain the package through a car window.

At step 204, the user 102 purchases one or more items from a merchant (e.g., a merchant associated with merchant device or server 130). For example, the user 102 can enter a physical store of a merchant, select items, and pay for the purchase. After payment for the items, the user 102 can indicate to the merchant that he or she wants the purchased items placed in the locker 145. The user 102 may provide the locker number to the merchant and authorize the merchant to open the locker 145. For example, the user 102 can indicate to the service provider via the mobile device 120 that the user 102 gives permission to a particular merchant to open the locker 145. When the beacon 140 detects a merchant device, identifying information of the merchant device can be passed to the service provider server 180 so that an authorized merchant is identified, and the locker 145 is opened.

The locker service allows the user 102 to continue shopping at other stores without the burden of carrying the item around. This frees the user 102 to spend as much time as he or she wants browsing and visiting other locations. In various embodiments, the merchant holds the purchased item for the user 102 until the user 102 is ready to pick up the items in locker 145. In other embodiments, the user 102 takes the item, drops it off at a kiosk with an attendant, the attendant places the item in the locker 145, and then the user 102 picks it up in the locker 145.

At step 206, the merchant places the purchased items in the locker. Each merchant that the user 102 visits may be provided with the number of the locker 145 so that each merchant can place purchased items in the locker 145 for the user 102. In some embodiments, the user 102 is notified each time an item is delivered to the locker 145. Delivery of an item is detected in various ways including, for example, a merchant or courier sending a signal from a merchant or courier device, detection of a merchant or courier device by a beacon, and detection of the opening and closing of a locker.

In various embodiments, the user 102's purchases are consolidated and the locker 145 is opened only once to reduce the risk of missing items. For example, even though the user 102 purchases items from Merchant A, Merchant B, and Merchant C, the items from all three merchants are delivered to the locker 145 all at once, rather than one by one. Once all purchased items are delivered, the user 102 can be notified. In some embodiments, merchants and couriers are allowed access to the locker 145 only at specific times or periods, to limit and better control access.

At step 208, when the user 102 is done shopping for the day, he or she returns to the parking space and locker. The user 102 takes out the mobile device 120. The mobile device 120 makes a connection with beacon 140. For example, the beacon 140 senses user 102's presence by way of electronic communication with mobile device 120. The beacon 140 receives a request to unlock a locker from the mobile device 120, and receives identification information such as account credentials, mobile device details (e.g., user identifier 126), and/or locker identification information from the mobile device 120.

At step 210, the beacon 140 passes the identification information to the service provider server 180. The locker associated with the mobile device 120 can be identified based on the identification information and opened. The user 102 can also be identified by the service provider server 180 using the user identifier 126 and/or the account credentials (e.g., user name, password, email address, telephone number, etc.). Identity verification may also be implemented based on one or more of a scan of an identity card, a photograph of a user's face, and/or a scan of the user's fingerprints.

At step 212, the service provider server 180 identifies the user 102 and determines which locker is associated with the user 102. For example, the service provider server 180 can look up the user 102 and retrieve the user 102's locker number from a database.

At step 214, the service provider server 180 instructs the merchant server 130 or another entity who has control over the locker 145 to open or unlock the locker 145. The user 102 can then receive the contents in the locker 145 or place an item in the locker 145.

Figure 3:
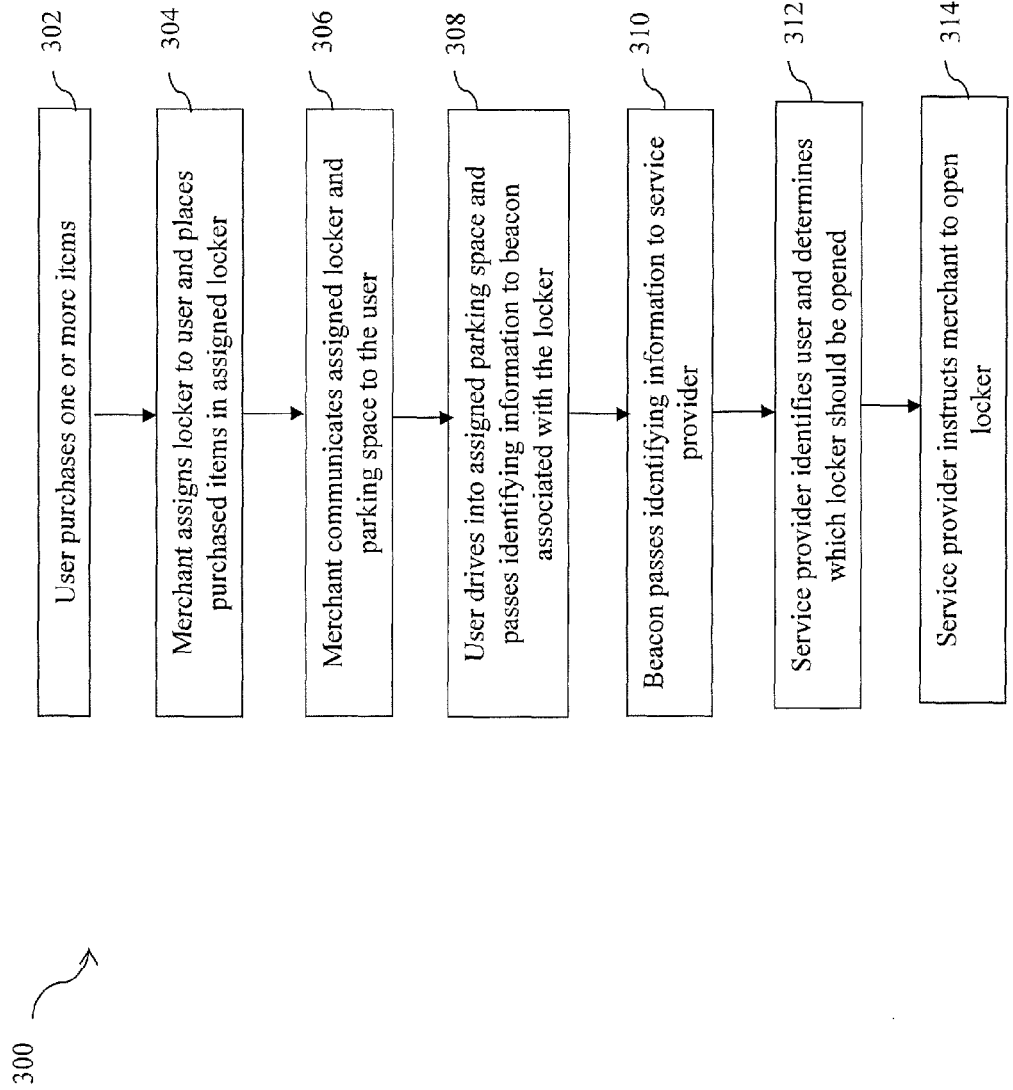
FIG. 3 is a flowchart showing a method for retrieving or depositing a package according to another embodiment of the present disclosure.

Referring now to FIG. 3, a flowchart 300 of a method for retrieving or depositing a package according to another embodiment of the present disclosure is illustrated. At step 302, the user 102 purchases one or more items from a merchant associated with merchant device or server 130. In an example, the user 102 uses mobile device 120 to shop. For instance, the user 102 may access a merchant site, seller site, marketplace site, or other site or mobile app that enables a user to shop and make a purchase. The user 102 then selects desired items for purchase. The purchase may be items, physical goods, digital goods, donations, services, etc. Note that items, as used herein, may include one or more of the different purchases listed above. The selected items may be placed in a cart, which the user 102 can review and edit if needed.

After payment for the items, the user 102 can indicate that he or she wants to use the drive-up locker service to pick up the purchased items. If the user 102 has pre-ordered items or arranged for a retail store to hold items for pick up, the store may be provided advanced notice of the user's visit and may arrange for the item to be available for the user 102 for pick up in a locker, such as when the user 102 enters a merchant parking lot.

At step 304, the merchant server 130 or another entity with control of the lockers assigns an unoccupied locker (e.g., locker 145) to hold packages for the user 102, and the merchant places the package in the locker 145. In certain embodiments, delivery of packages is tracked based on when a courier or merchant device is detected at the locker 145, and the locker 145 opened. In this way, there is accountability of the package in the event a package is missing.

In some embodiments, a label may be placed on the package that contains information regarding the assigned locker 145. The locker is assigned based on various factors, such as location of the user 102, size of item or package to be placed in the locker, the kind of item or package to be placed in the locker (e.g., if it needs refrigeration or any type of special handling), etc. The locker 145 can be conveniently located in the same building, shopping structure or shopping mall that the user 102 is shopping at, or a self-parking area of the mall. For example, the user 102 may be shopping at The Orange Mall, and the locker 145 is located in the parking structure connected to the Orange Mall. In some embodiments, the locker 145 is located in the parking lot of the merchant. For example, the locker may be located in a Wal-Mart parking lot. The assigned locker 145 is sized to hold the package and holds the package until the user 102 retrieves the package.

At step 306, the merchant server 130 communicates the location of the assigned locker (e.g., locker #123 at the second floor of the parking structure) and an assigned parking space corresponding to the assigned locker (e.g., parking space #123) to the user 102. For example, the merchant server 130 may send a message to the user 102 of the mobile device 120 (e.g., email message, telephone call, text message, etc.) informing the user 102 that to retrieve his or her package, he or she needs to visit the specific locker and park in the specific parking space. The merchant server 130 also sends the locker and user information to the service provider server 180.

At step 308, the user 102 drives into the assigned parking space. The mobile device 120 makes a connection with beacon 140. The beacon 140 senses user 102's presence by way of electronic communication with mobile device 120. The beacon 140 receives a request to unlock a locker from the mobile device 120, and receives identification information such as account credentials and/or mobile device details (e.g., user identifier 126) from the mobile device 120. In some embodiments, the mobile device 120 also transmits a locker number to the beacon 140.

At step 310, the beacon 140 passes this information to the service provider server 180. The user 102 can be identified by the service provider server 180 using the user identifier 126 and/or the account credentials (e.g., user name, password, email address, telephone number, etc.). Identity verification may also be implemented based on one or more of a scan of an identity card, a photograph of a user's face, and/or a scan of the user's fingerprints.

In some embodiments, even before the user 102 makes a purchase, he or she is assigned a locker and a parking space. For example, the user 102 makes a trip to the supermarket and pulls into the assigned parking space. The supermarket is notified that the user 102 is in the parking lot when a beacon associated with the assigned locker detects the mobile device 120. The supermarket knows which locker is assigned to the user 102 because of where the user 102 is parked. When the user 102 checks out, the supermarket can place the purchased groceries in the assigned locker.

In various embodiments, the service provider server 180 can confirm the identity of the user 102 based on vehicle identification details. For example, vehicle identification information may be extracted from image data taken of the vehicle parked in the parking space associated with the assigned locker. Vehicle identification information includes the license plate number of the vehicle, make of the vehicle, model of the vehicle, color of the vehicle, and a geographic location or license plate issuing authority/entity (e.g., state or country government) to which a license plate belongs or is associated with. Vehicle identification information can also include one or more distinguishing features of the vehicle (e.g., dents, scratches, bumper stickers, emblems, decals), and various vehicle features (e.g., sunroof, spoiler, rims or hubcaps, exhaust pipes, etc.). The vehicle identification information is used to further authenticate the user 102. In some embodiments, portions of the vehicle information may be stored in a third party database. For example, in some embodiments, license plate information may be stored in a third party database maintained by a state's Department of Motor Vehicles.

At step 312, the service provider server 180 identifies the user 102 and determines which locker contains the package for user 102. For example, the service provider server 180 can look up the user 102 and retrieve the user 102's assigned locker number from a database. At step 214, the service provider server 180 instructs the merchant server 130 to open or unlock the locker. The user 102 can then receive the contents in the locker.

If the user 102 fails to pick up his or her package, the service provider server 180 may send a notification to the mobile device 120 with the locker and parking space details. The user 102 may be allowed to pick up the package within a predetermined number of days. Beyond this predetermined period, the package may be returned to the merchant.

It should be noted that the locker or group of lockers can function not only as a pick up point, but a drop off point also. In this embodiment, the user 102 can drive into a parking space and select a locker as described above with respect to FIG. 2. The user 102 can also request a locker from the merchant server 130 and tell the merchant server 130 the size of the drop off load. The merchant server 130 assigns an available locker and parking space to the user 102. When the user 102 pulls up in the parking space, the mobile device 120 transmits identification information to the beacon 140. The beacon 140 sends the identification information to the service provider, and the service provider instructs the merchant to open the locker. The locker is then available for the user 102 to deposit the package he/she wants to drop off. The user 102 may post instructions on the package as how he/she wants the package to be handled. The features discussed above with respect to depositing a package in a locker are equally applicable to methods of dropping off a package in a locker.

The present disclosure describes systems and methods that reduce the burden of a user by allowing packages to be picked up and dropped off in lockers. The lockers are conveniently located near where the user is shopping. The user does not need to memorize or remember a password or carry a card to access the locker. Instead, the user's mobile device acts as the "key" to open the locker.

Figure 4:
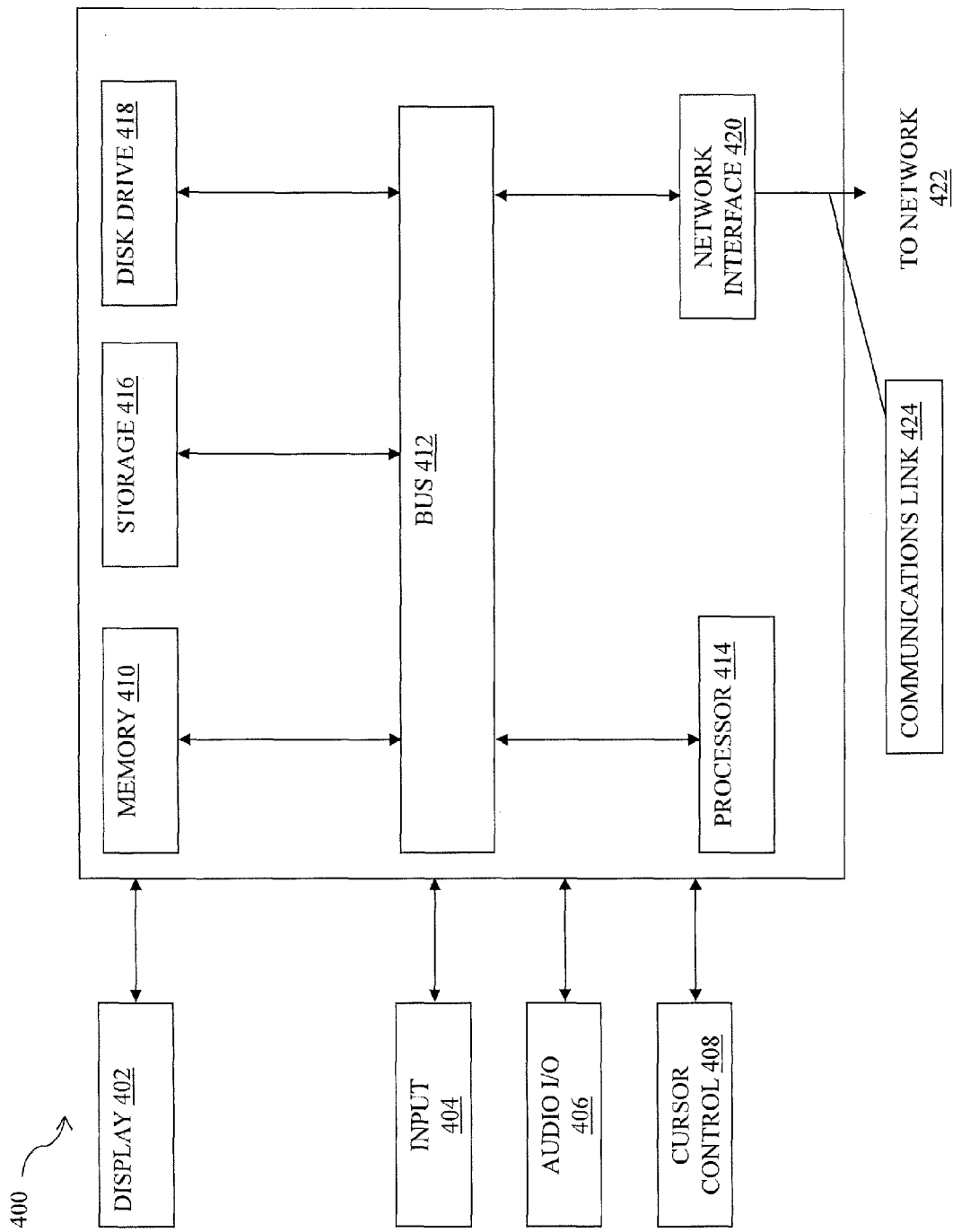
FIG. 4 is a block diagram of a system for implementing a device according to an embodiment of the present disclosure.

FIG. 4 is a block diagram of a computer system 400 suitable for implementing one or more embodiments of the present disclosure, including the mobile device 120, the merchant device or server 130, beacon 140, and the service provider server 180. In various implementations, the mobile device 120, merchant device or server 130, and beacon 140, and may comprise a mobile cellular phone, personal computer (PC), laptop, wearable computing device, etc. adapted for wireless communication, and the service provider server 180 may comprise a network computing device, such as a server. Thus, it should be appreciated that the devices 120, 130, 140, and 180 may be implemented as computer system 300 in a manner as follows.

Computer system 400 includes a bus 412 or other communication mechanism for communicating information data, signals, and information between various components of computer system 400. Components include an input/output (I/O) component 404 that processes a user (i.e., sender, recipient, service provider) action, such as selecting keys from a keypad/keyboard, selecting one or more buttons or links, etc., and sends a corresponding signal to bus 412. I/O component 404 may also include an output component, such as a display 402 and a cursor control 408 (such as a keyboard, keypad, mouse, etc.). An optional audio input/output component 406 may also be included to allow a user to use voice for inputting information by converting audio signals. Audio I/O component 406 may allow the user to hear audio. A transceiver or network interface 420 transmits and receives signals between computer system 400 and other devices, such as another user device, a merchant server, or a service provider server via network 422. In one embodiment, the transmission is wireless, although other transmission mediums and methods may also be suitable. A processor 414, which can be a micro-controller, digital signal processor (DSP), or other processing component, processes these various signals, such as for display on computer system 400 or transmission to other devices via a communication link 424. Processor 414 may also control transmission of information, such as cookies or IP addresses, to other devices.

Components of computer system 400 also include a system memory component 410 (e.g., RAM), a static storage component 416 (e.g., ROM), and/or a disk drive 418. Computer system 400 performs specific operations by processor 414 and other components by executing one or more sequences of instructions contained in system memory component 410. Logic may be encoded in a computer readable medium, which may refer to any medium that participates in providing instructions to processor 414 for execution. Such a medium may take many forms, including but not limited to, non-volatile media, volatile media, and transmission media. In various implementations, non-volatile media includes optical or magnetic disks, volatile media includes dynamic memory, such as system memory component 410, and transmission media includes coaxial cables, copper wire, and fiber optics, including wires that comprise bus 412. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 424 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system of a service provider, comprising:
   a non-transitory memory storing user identification information; and
   one or more hardware processors configured to execute instructions to cause the system to perform operations comprising:
      in response to a user parking in a specific parking space associated with a locker and receiving, by the service provider from a beacon associated with the locker, information corresponding to a first communication between a user device and the beacon, associating the locker with the user;
      providing, by the service provider, access to the locker to a merchant to deposit an item purchased by the user; and
      in response to receiving, by the service provider from the beacon, information corresponding to a second communication between the user device and the beacon, identifying the locker associated with the user and causing the locker to automatically unlock.

2. The system of claim 1, wherein the first communication, the second communication, or both comprise account credentials, a user identifier associated with the user device, locker identification information, or any combination thereof.

3. The system of claim 1, wherein the operations further comprise removing the association between the locker and the user in response to the user pulling away from the specific parking space and the beacon no longer detecting the user device.

4. The system of claim 1, wherein the operations further comprise receiving authorization information indicating the merchant is authorized to access the locker based on the user purchasing the item from the merchant.

5. The system of claim 4, wherein the operations further comprise:
   in response to the beacon detecting a merchant device of the merchant, receiving identifying information from the beacon; and
   determining whether the merchant is authorized to access the locker based on the authorization information.

6. The system of claim 1, wherein the operations further comprise tracking when the item is delivered to the locker.

7. A method for retrieving or depositing an item, comprising:
   in response to a user parking in a specific parking space associated with a locker and receiving, a beacon associated with the locker, information corresponding to a first communication between a user device and the beacon, associating, by one or more hardware processors of a service provider, the locker with the user;
   providing, by the one or more hardware processors, access to the locker to a merchant to deposit the item purchased by the user;
   receiving, from the beacon by the one or more hardware processors, user information corresponding to a second communication between the user device and the beacon;
   identifying, by the one or more hardware processors, a user based on the user information;
   matching, by the one or more hardware processors, the user to the locker; and
   causing, by the one or more hardware processors, the locker to automatically unlock.

8. The method of claim 7, wherein the user information comprises account credentials, a user identifier associated with the user device, or both.

9. The method of claim 7, wherein the locker is located near the specific parking space.

10. The method of claim 7, wherein the merchant is notified when the user parks in the specific parking space.

11. The method of claim 7, further comprising notifying the user when the item is delivered to the locker.

12. A non-transitory machine-readable medium having stored thereon machine-readable instructions executable to cause a machine to perform operations comprising:
   in response to a user parking in a specific parking space associated with a locker and receiving, by a service provider from a beacon associated with the locker, information corresponding to a first communication between a user device and the beacon, associating the locker with the user;
   providing, by the service provider, access to the locker to a merchant to deposit an item purchased by the user; and
   in response to receiving, by the service provider from the beacon, identification information corresponding to a second communication between the user device and the beacon, determining the locker associated with the user and causing the locker to automatically unlock.

13. The non-transitory machine-readable medium of claim 12, wherein the identification information comprises account credentials, a user identifier associated with the user device, locker identification information, or any combination thereof.

14. The non-transitory machine-readable medium of claim 12, wherein the locker is located near the specific parking space in a shopping center parking lot.

15. The non-transitory machine-readable medium of claim 12, wherein the locker holds one or more items purchased by the user from one or more merchant in a shopping center.

16. The non-transitory machine-readable medium of claim 15, wherein the one or more items are consolidated and delivered to the locker once.

17. The non-transitory machine-readable medium of claim 15, wherein the operations further comprise notifying the user when the one or more items are delivered.

* * * * *